United States Patent
Appelbaum

(10) Patent No.: US 6,604,342 B1
(45) Date of Patent: Aug. 12, 2003

(54) METHOD AND APPARATUS FOR PACKAGING ARTICLES IN CARD AND BLISTER PACKAGES

(76) Inventor: Paul Appelbaum, 16371 Wimbeldon La., Huntington Beach, CA (US) 92649

( * ) Notice: Subject to any disclaimer, the term of this patent is extended or adjusted under 35 U.S.C. 154(b) by 0 days.

(21) Appl. No.: 09/549,306

(22) Filed: Apr. 13, 2000

(51) Int. Cl.[7] .......................... B65B 51/02; B65B 51/10
(52) U.S. Cl. .................. 53/471; 53/373.8; 53/374.8; 53/376.6; 156/272.2; 156/379.8
(58) Field of Search ................ 156/272.2, 273.7, 156/275.7, 379.8; 53/376.5, 373.3, 476, 467, 383.1, 373.8, 374.8, 471

(56) References Cited

U.S. PATENT DOCUMENTS

| | | | | |
|---|---|---|---|---|
| 4,009,047 A | * | 2/1977 | Lindsay | 137/9 |
| 4,936,764 A | * | 6/1990 | Lyons et al. | 425/439 |
| 5,031,383 A | * | 7/1991 | Hustad | 53/432 |
| 5,204,142 A | * | 4/1993 | Okumura | 427/285 |
| 5,259,169 A | * | 11/1993 | Appelbaum et al. | 53/373.8 |
| 5,345,747 A | * | 9/1994 | Raque et al. | 53/478 |
| 5,524,419 A | * | 6/1996 | Shannon | 53/431 |
| 5,900,098 A | * | 5/1999 | Mueller et al. | 156/275.7 |
| 6,096,163 A | * | 8/2000 | Wensel | 156/357 |

\* cited by examiner

Primary Examiner—Rinaldi I. Rada
Assistant Examiner—Gloria Weeks

(57) ABSTRACT

A method and apparatus for packaging articles in card and blister packages is disclosed, the card and blister package comprising a first or blister piece of clear pre-formed plastic with a shaped cavity for receiving small articles, and a flat flange portion along its perimeter. The second piece of the package is a flat rectangular chipboard card, appreciably larger than the card and blister piece and having printing on one or both sides. The flange of the card and blister piece can be bonded to the surface of a card to form a card and blister package for the enclosed articles.

Apparatus for producing a plurality of packaged articles includes a plurality of package holders mounted on the surface of a conveyor belt that is porous to UV light, the holders made of a UV light transparent material and having upper surfaces with shaped recesses for removably supporting the plastic card and blister pieces with their cavities upwardly faced and for supporting the cards in position above the card and blister pieces. At the forward part of the conveyor the card and blister cavities can be filled by the pertinent articles of commerce, UV curable adhesive applied to the pertinent surfaces and then cards placed thereover. The UV curable adhesive is instantly cured as the holders are advanced through a UV reactor, and sealed packages fall free from their holders, for collection, as they are inverted during passage around the end of the conveyor.

3 Claims, 3 Drawing Sheets

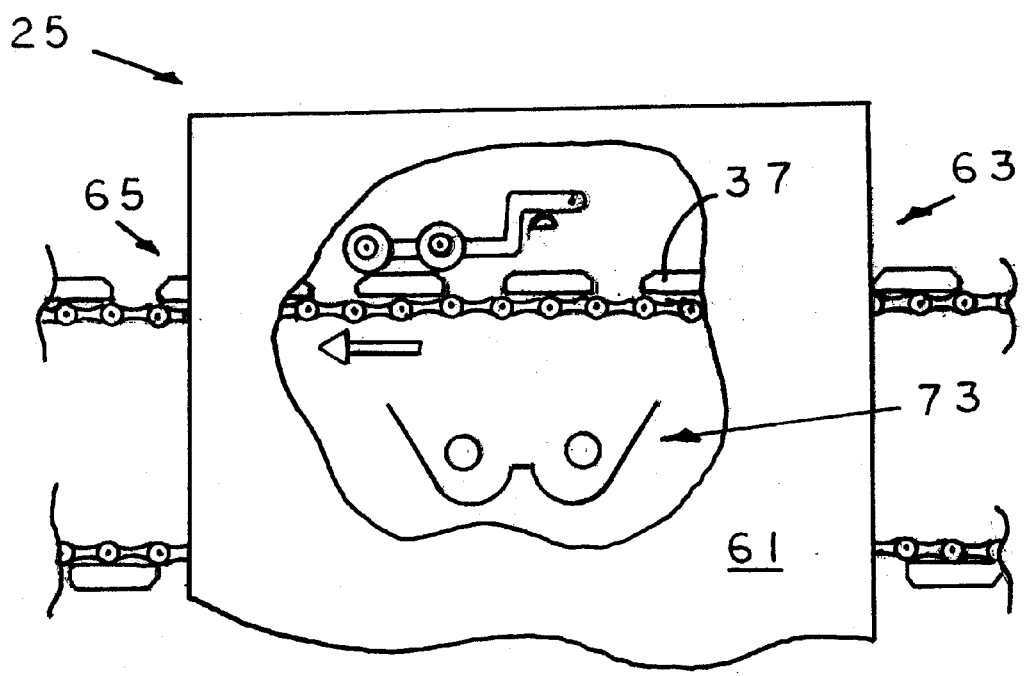

METHOD AND APPARATUS FOR PACKAGING ARTICLES IN CARD AND BLISTER PACKAGES

BACKGROUND OF THE INVENTION

1. Field of the Invention

The present invention relates to a method and apparatus for packaging articles in clear plastic packages, and more particularly to method and apparatus for sealing articles in card backed card and blister packages sealed with UV-curable adhesive.

2. Description of the Prior Art

The so-called "card and blister" type package has been used extensively for packaging small articles in a form that seals yet displays the article for the benefit of purchasers in a retail environment. Such a conventional card and blister package comprises a clear plastic portion that has a preformed cavity for holding an article(s), and a generally flat outer perimeter flange-like portion. A rectangular card of chipboard, or the like, appreciably larger than the card and blister piece, has printing on one or both of its sides, and one side is coated with heat-activated adhesive.

Conventional packaging techniques involve supporting a number of card and blister pieces on a segment of a rotary work table or "lazy Susan", loading the card and blister cavities with the article(s) to be packaged, placing the adhesive-coated surfaces of the cards into contact with the card and blister flanges. Then the packages are moved to a station where a hot plate is pressed into the backs of the cards to activate the heat activatable adhesive. Equipment for producing such packages requires a fair amount of special tooling, and is complex, energy-consumptive and expensive. The necessary time for heating and cooling limits productivity, and heat dissipation is a concern to be addressed. There appear to be additional limitations effecting productivity, inherent in the rotary work table type configurations.

SUMMARY OF THE INVENTION

In view of the foregoing it is a general object of the present invention to provide an improved method for packaging items in card and blister type packages.

Another object is to provide a simple yet effective packaging apparatus that can be commercially available at a lower price than conventional card and blister packaging technology.

A further object is to provide a packaging method with improved productivity.

Yet another object is to provide apparatus and method using UV light for packaging articles in card and blister type packages.

A further object is to provide an energy-efficient packaging method that does not involve application of heat.

These and other objects and advantages are provided by a method for packaging articles in card and blister-type packages and involves providing UV-transparent means on the outer surface of a UV light-porous conveyor belt, for supporting a plurality of plastic card and blister pieces against downward and lateral movement with their cavities facing upwards. The conveyor has a forward, intermediate, and a rearward part, and at the forward part articles are loaded within the card and blister cavities, then liquid UV-light curable adhesive is applied along the flanges of the card and blister pieces, or to a pertinent surface of the card. The method includes placing and positioning a printed card in contact with the flange of each card and blister piece and then advancing the supported packages to a UV illumination station at the intermediate part of the conveyor where the cards are pressed downwardly into contact with the flanges of the card and blister piece as UV exposure instantly cures the adhesive.

In one preferred embodiment of the invention the downward pressure is provided by rollers, and in another embodiment, downwardly directed air jets are used. Illumination is from UV light directed upwardly through the conveyor belt upper flight and through the UV transparent holders. The conveyor will then advance the sealed packages to the rear part of the conveyor, and around the conveyor end whereby the holders are inverted allowing gravity to cause the packages to drop from the holders for collection and further processing for shipment.

BRIEF DESCRIPTION OF THE DRAWINGS

FIG. 5 is a partial side elevational (schematic) view illustrating the UV curing chamber of apparatus according to the invention.

DETAILED DESCRIPTION OF THE INVENTION

Figure 1:
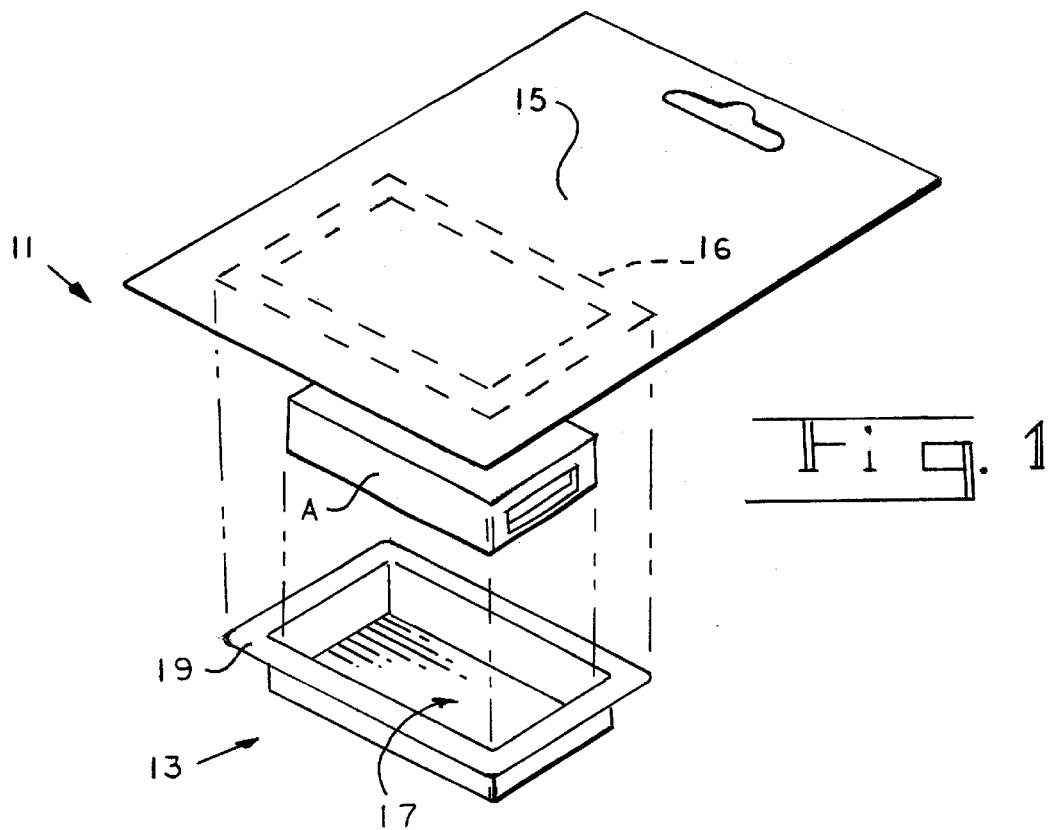
FIG. 1 is an exploded view in perspective illustrating a card and blister package of the type employed in the method and apparatus, according to the present invention, for packaging articles in card and blister packages.

Referring now to the drawings, FIG. 1 shows that a typical card and blister type package for an article A is comprised of a clear plastic card and blister piece 13 and a card 15. The card and blister piece has a pre-formed cavity or pocket 17 for receiving the article A, and the card 15 is made of chipboard or similar material, and has printing on at least one of its major surfaces. The broken lines shown on the card 15 in FIG. 1 outlines the area 16 of the card undersurface that is contacted by the card and blister flange 19 when the flange is adhesively bonded to the card in a manner to be described.

Figure 2:
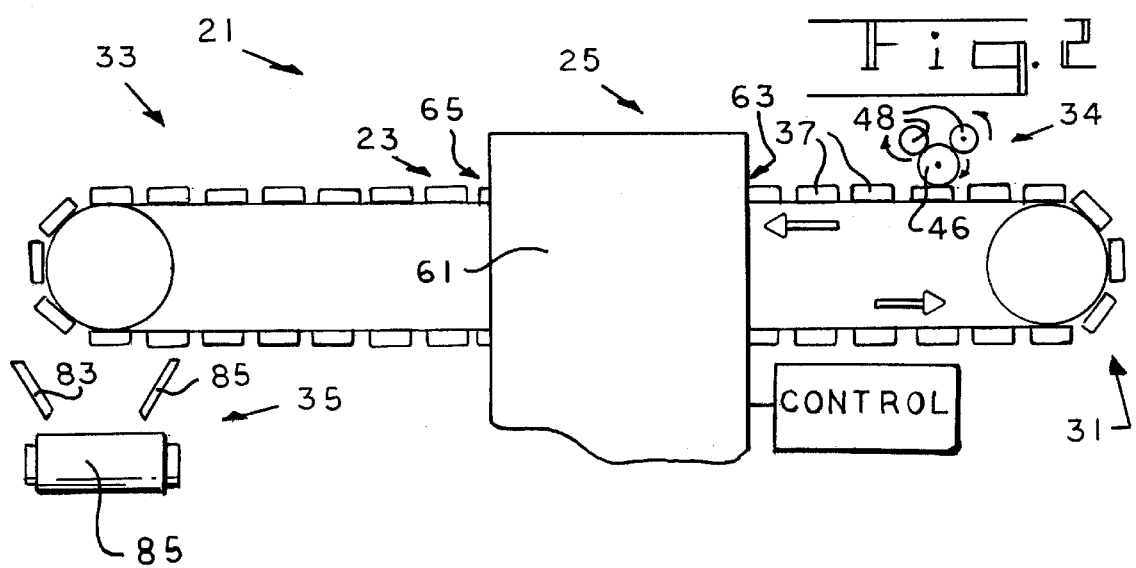
FIG. 2 is a schematic illustration of a preferred embodiment of packaging apparatus according to the present invention.

FIG. 2 illustrates schematically that the main components of a preferred embodiment of packaging apparatus 21 according to the invention includes a conveyor 23, a UV curing reactor 25, and a controller 27 for controlling operation of the conveyor 23 in conjunction with the curing reactor 25. The conveyor has a loading end or forward part 31 and a take-off end or rear part 33, and the curing reactor 25 intercepts the intermediate portion of the conveyor and is adapted for illuminating un-cured packages carried on the top flight of the conveyor, in a manner to be described hereinafter. FIG. 2 also illustrates an adhesive dispenser 34 disposed above the forward part of the conveyor for applying liquid UV adhesive to blister pieces 13 in a manner to be described.

A package collector and handler 35 is positioned below the conveyor take-off end 33, for collection of completed packages, in a manner to be described.

Figure 3:
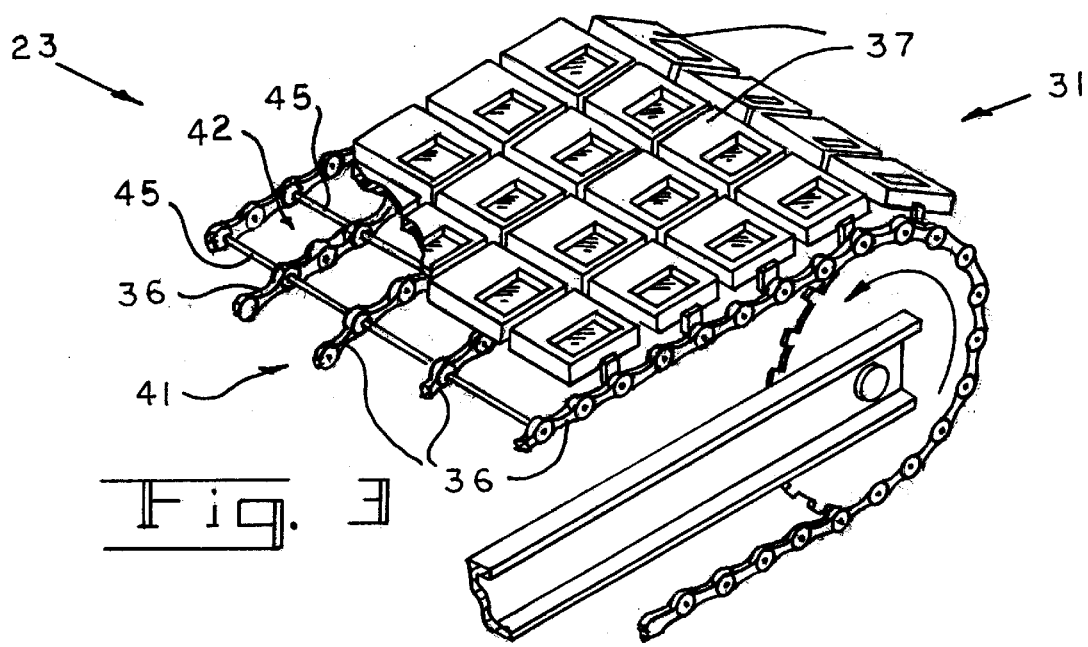
FIG. 3 is a partial view in perspective illustrating the forward part of the conveyor of the packaging apparatus according to the present invention.
Figure 4:
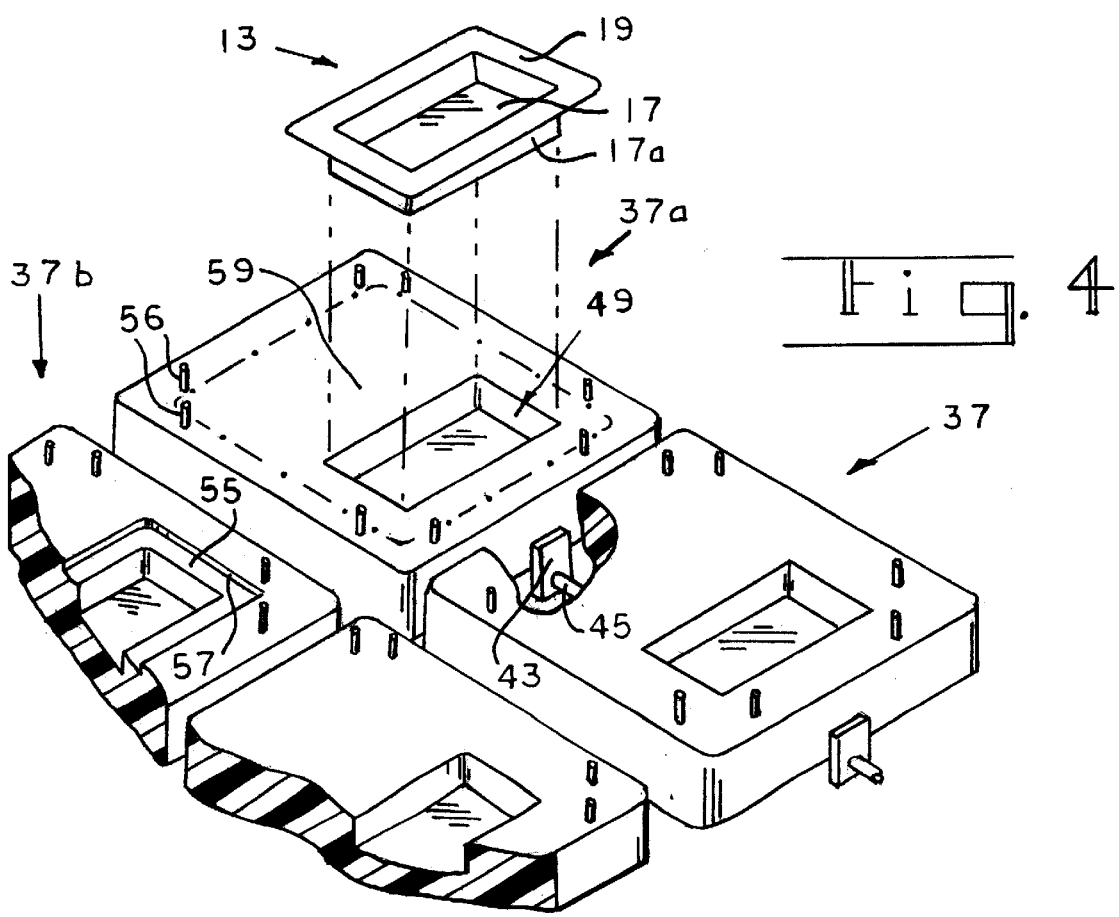
FIG. 4 is an enlarged partial perspective view, with parts broken away for the sake of clarity, for illustrating the conveyor-mounted package holders of the apparatus of FIG. 3.

FIGS. 3 and 4 show that the inventive apparatus features a number of package holders 37 that are mounted to the surface of the conveyor belt 41 in a manner that permits them to be carried around the respective ends of the conveyor 23, as well as being supported relatively stationarily with respect to the conveyor belt surface during horizontal travel along the upper flight of the conveyor belt. Note how the structure of conveyor 23 features a number of drive chains 36 and transversely extending struts 45, which components are spaced apart such that the holders 37 are supported over large UV light-passing openings 42.

The enlarged view of FIG. 4 shows how on one side of a holder 37a there is a connector 43 that is coupled to a transverse conveyor belt strut 45, the holder 37a being similarly attached to the conveyor belt at its opposite side (not shown).

Each package holder 37 is constructed of a suitable polymeric material that is substantially transparent to UV light, and the conveyor belt has a mesh-like grid structure with substantial amount of (UV-passing) openings that will be advantageously employed in the UV curing step of the invention.

As FIG. 4 best shows, the upper part of each support 37a is characterized by a recess 49 that is shaped to accomodate the card and blister 17a of a card and blister piece 13. It should be appreciated how the holder upper surface 59 will engage the perimeter flange 19 and support it against downward movement as the card and blister piece is supported against lateral movement by virtue of the engagement of card and blister 17a with the recess 49.

FIG. 4 also shows a variant 37b of a package holder wherein there is a recessed shelf 55 for supporting a flange 19, and vertical edges 57 that will engage the outer edges of the flange 19 to hold the card and blister piece against lateral movement.

In order to position and stabilize a card 15 in alignment on a holder 37 with respect to the card and blister flange 19, an arrangement of conventional "spring pins" 56 are provided on the top surface of each holder as FIG. 4 illustrates. The phantom lines are drawn on holder 37a to illustrate how the spring pins 56 are adapted for engaging the corner regions of a card. The spring pins 56 are biased by spring force in their extended positions shown, and are downwardly depressible to lie flush with surface 59, which capability will facilitate the application of downward pressure to the top of a card during the curing step of the process, to be described.

As shown in FIGS. 2 and 5, the UV reactor 25 includes housing 61 having walls that are configured to prevent leakage of UV light from the housing interior, while UV-confining openings (not shown) in the housing front 63 and rear 65 allow passage of the conveyor belt and attached package holders 37. As shown in FIG. 5, there are a number of rollers 69 of relatively soft rubber or similar resiliently pliable material that are spaced a distance above the conveyor such that they will make rolling contact with the tops of the cards of card and blister packages carried by holders 37 as the holders 37 are advanced by the conveyor belt through the reactor 25. The rollers 69 extend the width of the conveyor belt and can resiliently press down on the package cards to ensure excellent contact between surfaces of the card and the card and blister flange during UV curing, in a manner to be described hereinafter. FIG. 5 also shows that below the rollers and the upper flight of the conveyor belt, is mounted a UV light source 73 of conventional design, and configured to direct UV light upwardly.

The adhesive dispenser 34, illustrated in FIG. 2, includes a roller 46 that extends horizontally across the width of the conveyor, and it is comprised of a suitable resiliently deformable polymeric material. A pair of counter-rotatable rollers 48 engage the upper surface of roller 46, the aforementioned rollers being supported and driven by conventional means (not shown). Liquid UV adhesive can be supplied to the trough-like space formed between rollers 48, for transfer to the roller 46. It should be appreciated how the bottom of roller 46 can be adjustably positioned so as to make contact with the flanges 19 of blister pieces carried on the holders 37.

It should also be appreciated how relative length of the conveyor forward part 31, and the location of the adhesive application station there along are selected in view of the requirements for loading the blister pieces with the articles of commerce, and for placement of cards over the wetted blister pieces, among other things.

The invention contemplates other means for exerting downward pressure on cards the 15, and includes the use of conventional air knives that have downwardly directed nozzles that extend across the width of the conveyor. A belt (not shown) can also be used for the same purpose. The lower flight of the belt would provide a generally flat surface for engaging the cards.

As FIG. 2 shows, the package collector and handler 35 is positioned below the conveyor take-off end 33, and includes guide chute 83 and a conveyor 85 that is oriented at right angles to the conveyor 23. In a variant of the invention a collection bin (not shown) is used in lieu of collector 35.

In operation of the above-described apparatus, a number of card and blister pieces 13 are loaded within the respective cavities 49 of the package holders 37 at the conveyor loading end 31, illustrated in FIG. 2. Articles A are then placed in the card and blister cavities 17, and then quantities of UV-curable adhesive, such as is available commercially under the trademark SIMPL-SEALANT, is applied to the flanges 19. This can be accomplished by the applicator 34, described above. In other embodiments of the invention this is done by depositing beads of adhesive from the nozzles of hand held applicators of squeeze bottles or air-powered applicators (not shown). In a variant of the invention, adhesive is not applied directly to the flanges 19 but is pre-applied using silk screen or other printing techniques, specifically to the surface area 16 of the cards (shown in FIG. 1).

Next, cards 15 can be placed atop the adhesive-wetted flanges of the card and blister pieces. During the foregoing steps the conveyor is operated intermittently and at suitable speeds as necessary to allow placement of the card and blister pieces, the loading of articles A, the application of adhesive, and the placing of cards. The conveyor is then operated to advance the conveyor belt to move the adhesive-wetted and covered packages through the reactor 25 at a predetermined speed. Within the reactor 25, the upwardly directed UV light from the source 73 penetrates the conveyor belt and is transmitted through the (UV light-transparent) package holders 37 and the clear plastic of the card and blister pieces, thereby irradiating and instantly curing the UV curable adhesive.

As illustrated in FIG. 2, the conveyor then advances the sealed packages from the reactor 25 to the conveyor take-off end 33. As the package holders 37 are moved around the end of the conveyor and shifted to an inverted position, gravity causes the packages to drop conveniently into the collector and handler 35. The guide chutes 83 direct the falling packages to conveyor 85 which carries the packages to a station where they are boxed for shipment.

While particular embodiments of the invention have been described, it should be understood that the invention is not limited thereto, and includes other variants and modifications that will readily occur to those persons of ordinary skill in the art, given the benefit of this disclosure. Thus it is intended that the invention be given its full scope and breath as defined in the claims which follow.

What is claimed is:

1. Method for sealing articles in card and blister packages, wherein a card and blister package comprises a card and blister piece of clear plastic having a preformed cavity for receiving one or more articles and a flange, and a second piece comprising a flat generally rectangular card, said method including the steps of:

a) providing movable platforms of UV light transparent material having a plurality of shaped recesses for removably supporting a plurality of said card and blister pieces with said cavities outwardly-facing and for holding said flanges against relative inward and lateral movement, and wherein said platforms are mounted to a UV light porous conveyor belt;

b) mounting a plurality of said card and blister pieces in said recesses;

c) placing said articles in the cavities of said mounted card and blister pieces;

d) applying UV light curable adhesive to the flanges of said mounted card and blister pieces or to a selected surface region of said card;

e) covering the top of each of said card and blister pieces with said card whereby said flange engages a surface portion of said card with said adhesive disposed between said flange and said card surface; and f) directing UV light upwardly through said conveyor belt and platforms from a light source below said platforms and irradiating said supported card and blister pieces thereby instantly curing said adhesive and providing sealed card and blister packages.

2. A method as defined in claim 1 further including the step of inverting said platforms cause said sealed packages to fall from said supporting means, and collecting said packages.

3. A method as defined in claim 1 wherein said adhesive application is provided by engaging said blister pieces between rollers for advancing said shell, one of said rollers being coated with said adhesive and engaging said tongue surfaces.

* * * * *